United States Patent [19]

Kono et al.

[11] 4,217,127
[45] Aug. 12, 1980

[54] PROCESS FOR PRODUCING UREA GRANULES

[75] Inventors: Hisashi Kono; Shigeyuki Nakai; Masaki Hisadomi; Norimichi Minemura; Tetsuo Okita; Sigeru Kawamura, all of Ube, Japan

[73] Assignee: Ube Industries, Ltd., Yamaguchi, Japan

[21] Appl. No.: 15,902

[22] Filed: Feb. 28, 1979

[30] Foreign Application Priority Data

Mar. 3, 1978 [JP] Japan .................................. 53-23645

[51] Int. Cl.² ............................................... C05C 9/00
[52] U.S. Cl. ...................................... 71/28; 427/213; 118/DIG. 5
[58] Field of Search .................. 427/213; 118/62, 303, 118/DIG. 5; 71/27, 28, 64 DA; 264/117, DIG. 51; 425/7

[56] References Cited

U.S. PATENT DOCUMENTS

| | | | |
|---|---|---|---|
| 2,979,421 | 4/1961 | Rissman et al. | 71/64 DA X |
| 3,001,228 | 9/1961 | Nack | 264/DIG. 51 X |
| 3,206,297 | 9/1965 | O'Connor | 71/28 |
| 3,231,413 | 1/1966 | Berquin | 118/303 X |
| 3,253,944 | 5/1966 | Wurster | 427/213 |
| 3,615,187 | 10/1971 | Suzukawa et al. | 71/64 DA X |
| 3,856,441 | 12/1974 | Suzukawa et al. | 425/7 |
| 3,940,514 | 2/1976 | Baker et al. | 118/303 X |
| 4,071,304 | 1/1978 | Chauvin et al. | 427/213 X |
| 4,123,570 | 10/1978 | Van Hijfte et al. | 427/213 X |
| 4,142,885 | 3/1979 | Heumann et al. | 71/28 |

Primary Examiner—Sam Silverberg
Attorney, Agent, or Firm—Burgess, Ryan and Wayne

[57] ABSTRACT

Urea granules having a desired size are produced in a fluidized bed formed in a vertical cylindrical vessel which is partitioned into an upper compartment and a lower compartment by means of a funnel shaped partition having numerous holes through which the lower compartment is connected to the upper compartment, by: (A) feeding urea solid seed particles into the upper compartment; (B) atomizing and injecting upward a liquid containing a material to be incorporated onto the urea seed particles into the upper compartment through a nozzle having a top thereof located just above a center of the bottom of the funnel-shaped partition; (C)-(1) upwardly blowing a number of streams of an inert gas having a temperature of from 50° to 98° C. into the upper compartment through the holes of the funnel-shaped partition; (C)-(2) blowing upward a stream of an inert gas having a temperature of from 30° to 120° C. into the upper compartment through an annular opening formed in the bottom of the funnel-shaped partition and surrounding the atomizing nozzle, whereby the atomized liquid droplets can adhere to the urea seed particles and be dried or solidified while the particles are circulated in a fluidized bed in the upper compartment; (D) discharging the resultant urea granules from the upper compartment through the annular opening and; (E) discharging exhaust gas from the top end of the upper compartment.

24 Claims, 2 Drawing Figures

PROCESS FOR PRODUCING UREA GRANULES

FIELD OF THE INVENTION

The present invention relates to a process and apparatus for producing urea granules. More particularly, the present invention relates to a process and apparatus for producing urea granules in a fluidized bed, by feeding seed particles of urea into the fluidized bed and by atomizing a liquid containing a material to be incorporated onto the urea seed particles into the fluidized bed, so as to cause the atomized liquid droplets to adhere to the urea seed particles and the adhered liquid to be dried.

BACKGROUND OF THE INVENTION

Various processes and apparatuses for producing urea granules have been disclosed, for example, by Japanese Patent Application Publication No. 28-4763 (1953), Japanese Patent Application Publication No. 30-6263 (1955) and Japanese Patent Application Publication No. 34-5718 (1959). In these processes and apparatuses, a urea aqueous solution or a urea melt is dropped down through a nozzle located at the top of a vertical cylindrical or prismatic granulating column. While the drops of the urea solution or melt fall down through the granulating column, the drops are dried or solidified. This type of process is referred to as an atomize-granulating process. In this type of process, the granulating column is required to be very tall so as to ensure the completion of drying or solidifying of the urea solution or melt drops. Also, this type of process is disadvantageous in that the size of the resultant granules is limited to ranges of from 1 to 2 mm. That is, it is difficult to produce urea granules having a size larger than 2 mm by the above-mentioned atomize-granulating process. Other types of atomize-granulating processes and apparatuses were disclosed, for example, in Japanese Patent Application Publication No. 34-5718 (1959), Japanese Patent Application Publication No. 39-24862 (1964) and U.S. Pat. No. 3,450,804. However, even with these types of processes and apparatuses it is still difficult to produce urea granules having a size larger than 2 mm.

Recently, the bulk blending of different fertilizer granules, such as urea, ammonium phosphate and potassium chloride, has become an important operation in the fertilizer industry. The purpose of the bulk blending is to produce a mixed fertilizer of a diesired N-P-K formulation that can be stored, shipped and spread in available commercial equipment without excessive segregation of the various components. A number of studies have been made on the segregation experienced in the blending and handling of these fertilizers. When granules having different size ranges are blended, segregation is likely to occur, resulting in incorrect composition at the point of use. The greatest single factor in producing segregation is the size distribution of the different materials. Differences in shape or density have little effect.

Accordingly, for the purpose of even distribution of the bulk blend fertilizer, it is desirable that the size of the urea granules be similar to those of the ammonium phosphate granules. However, the size of ordinary ammonia phosphate granules is in ranges of from 1.1 to 3.36 mm. That is, the size of the ammonium phosphate granules is larger than those of the urea granules produced by the conventional atomize-granulating process and apparatus.

Sometimes, the urea granules are coated with a coating material, such as sulphur and a polyolefin, in order to prepare a slow releasing nitrogen fertilizer. It appears that granules, regardless of their size, must have coatings of about the same thickness to produce similar dissolution rates. If this is a valid observation, then the amount of sulphur a substrate urea requires per unit of weight varies directly with the surface area of the urea substrate or inversely with the square of the average diameter of the granules, provided all other variables are constant. Therefore as long as agronomic benefits and handling characteristics are equal, if the size of the urea particles to be coated increases, the coating needed will decrease, reducing the production costs per unit of nitrogen and increasing the nitrogen content in the final products.

A process suitable for producing the urea granules having a size large enough for being blended with the conventional ammonium phosphate granules was disclosed in Chemical Engineering Progress, Vol. 69(2), pages 62 through 66, 1973. This type of process is referred to as "a spherodizer granulation process". In this process, seed solid particles of urea are recycled through a rotating drum, and a urea melt is atomized into the drum so that the atomized urea melt particles adhere to the urea seed particles and the adhered melt is solidified. However, this process is disadvantageous in that since the urea melt is maintained in the melt state for a long period of time, not only does the content of biuret in the resultant urea granules become undesirably high, but also, a large amount of urea melt adheres to the inside surface of the rotating drum.

Another granulating processes and apparatuses which are suitable for ammonium nitrate and potassium chloride were disclosed for example, by British Pat. No. 962,265, in which a spouted bed is used. In the process of this British patent, a vertical cylindrical vessel having a funnel-shaped bottom is employed. The lowest end of the funnel-shaped bottom is connected to a conduit for blowing a gas upward into the vessel and a thin pipe for spray-injecting a liquid containing a material to be granulated is inserted into the conduit. The top end of the liquid spray-injecting pipe is located in the lowest end of the funnel-shaped bottom of the vessel. When the liquid is spray-injected into the vessel and the gas is blown into the vessel, a spouted bed of the spray-injected liquid droplets and seed particles of the material to be granulated which have been fed thereinto is formed. However, this process is disadvantageous in that the circulation of the spray-injected liquid droplets and the seed particles in the vessel is uneven. Accordingly, the particles located close to the inside wall of the vessel and the bottom cannot be vigorously fluidized and merely form a moving bed. In this moving bed, it is impossible to produce granulates having a uniform size. Sometimes, the liquid droplets and seed particles in the moving bed adhere to each other to form large agglomerations. Also, this British patent contains no disclosure of particular conditions for producing urea granules.

Still other granulating processes and apparatuses for urea and other chemical fertilizers were disclosed, for example, in Japanese Patent Application Publication No. 46-6403 (1971), Japanese Patent Application Publication No. 47-7442 (1972), British Pat. No. 1,142,046 and U.S. Pat. No. 3,856,441, in each of which a fluidized bed is utilized. In these types of processes, a vertical cylindrical vessel, which is partitioned into an upper compartment and a lower compartment by a funnel-shaped partition converging downward to a bottom thereof, is used for forming a fluidized bed therein. The funnel-shaped partition has a number of holes formed therein.

In order to form the fluidized bed, powdery solid urea is fed into the upper compartment, a number of streams of an inert gas are blown upward into the upper compartment through the holes of the funnel-shaped partitions and a stream of an inert gas is blown vertically upward into the upper compartment through a center of the bottom of the funnel-shaped partition. A liquid containing a material to be incorporated onto the powdery urea fine particles is spray-injected into a middle or upper portion of the fluidized bed. The spray-injected liquid droplets adhere to the powdery urea fine particles and the adhere liquid is dried in the fluidized bed. In the abovementioned process, the circulation, of the urea fine particles and the spray-injected liquid droplets in the fluidized bed can be made more uniform than in the above-mentioned spouted bed process. However, it was found that, in the above-mentioned fluidized bed processes, since the feed of the liquid containing the material to be incorporated onto the powdery urea fine particles is carried out by using a nozzle projected through a side wall of the upper compartment of the cylindrical vessel into the middle or upper portion of the upper compartment, the fed liquid adheres to the surface and top end of the nozzle and the adhered liquid layer is dried on the nozzle. Also, the powdery urea fine particles adhere to the liquid layer so as to form a thick layer or large lumps on the nozzle. This phenomenon promotes the formation of large agglomerations of the urea granules and causes the efficiency of producing the urea granules to be reduced.

Also, in the above-mentioned fluidized bed processes, it was found that the powdery urea fine particles to be fed into the fluidized bed have too small of a size as seeds for producing the urea granules having a relatively large size. According, not only is the efficiency of producing the urea granules too low, but also the resultant small urea granules tend to adhere to each other so as to form large agglomerations. Furthermore, in the conventional fluidized bed processes, it was found that since the resultant urea granules are discharged through the bottom of the funnel-shaped partition into a collecting vessel located below the lower compartment of the cylindrical vessel, the fluctuations in flow rate, flow velocity and pressure of the inert gases blown into the upper compartment during the urea granule producing process, results in a change in the stability of the fluidized particles. Sometimes, a large amount of the fluidized particles having various sizes fall down directly into the collecting vessel. The particles received in the collecting vessel can not be recycled into the fluidized bed. Accordingly, it is difficult to selectively discharge the resultant urea granules having a desired size. This difficulty results in unevenness in size of the discharged urea granules.

Under these circumstances, an improved process and apparatus for producing urea granules having a uniform size and quality without difficulty are desired.

SUMMARY OF THE INVENTION

An object of the present invention is to provide a process and apparatus for producing urea granules having a desired size, especially, such a large size that conventional atomizing granulating processes never attain it.

Another object of the present invention is to provide a process and apparatus for producing urea granules suitable for bulk-blend fertilizer without formation of agglomeration of the urea granules.

A further object of the present invention is to provide a process and apparatus for producing urea granules by simultaneously carrying out the adhering of a liquid containing a material to be incorporated onto the urea seed particles and the drying or solidifying of the adhered liquid on the urea seed particles.

Still another object of the present invention is to provide a process and apparatus for producing urea granules while the production of undesirable biuret is prevented.

The above-mentioned objects can be attained by the process of the present invention which is carried out in a fluidized bed formed in a vertical cylindrical region which is partitioned into an upper portion and a lower portion thereof by means of a funnel shaped partition converging toward a bottom thereof, the upper portion is connected to the lower portion through a number of holes formed in the partition, which process comprises the steps of:

(A) feeding solid seed particles of urea into the upper portion of the cylindrical region;

(B) atomizing and injecting upward a stream of a liquid containing a material to be incorporated onto the urea seed particles, into the upper portion of the cylindrical region through a nozzle having a top end thereof located just above the center of the bottom of the funnel-shaped partition, said liquid being forwarded to said nozzle through a path extending through the lower portion of the cylindrical region;

(C) forming a fluidized bed of the urea seed particles and the atomized liquid droplets in the upper portion of the cylindrical region, (1) by blowing a number of streams of an inert gas, not reactive to urea and the liquid, and having a temperature of from 50° to 98° C., from the lower portion into the upper portion of the cylindrical region through the holes of the funnel-shaped partition, and (2) by blowing upward a stream of an inert gas, not reactive to urea and the liquid, and having a temperature of from 30° to 120° C. into the upper portion of the cylindrical region through an annular opening formed in the bottom of the funnel-shaped partition and surrounding the atomizing nozzle of the liquid, the inert gas being introduced to the annular opening through a path extending through the lower portion of the cylindrical region, whereby the atomized liquid droplets are allowed to adhere onto the urea seed particles and dried or solidified;

(D) discharging the resultant urea granules from the upper portion of the cylindrical region through the annular opening and the inert gas path, and;

(E) discharging exhaust gas from the upper portion of the cylindrical region.

The process described above can be carried out by using the apparatus of the present invention, which comprises:

(A) a vertical cylindrical vessel which is partitioned into an upper compartment and a lower compartment thereof by means of a funnel-shaped partition converging toward a bottom thereof, the partition having a number of holes formed therein through which the upper compartment is connected to the lower compartment, said lower compartment being connected to a supply source of an inert gas;

(B) means for feeding seed particles of urea connected to the upper compartment of the cylindrical vessel;

(C) a vertical conduit connected to the bottom of the funnel-shaped partition, said conduit extending through the lower compartment of the cylindrical vessel and being connected to a supply source of an inert gas;

(D) a vertical nozzle inserted into the vertical conduit along the longitudinal axis of the vertical conduit and having a top end thereof located just above the top end of the vertical conduit, the vertical nozzle being composed of a core pipe which is connected to a supply source of a liquid containing a material to be incorporated onto the urea seed particles, and a sheath pipe which surrounds the core pipe and is connected to a supply source of an inert gas, and an annular path for the inert gas being formed between the core pipe and the sheath pipe;

(E) means for discharging the resultant urea granules, connected to the vertical conduit, and;

(F) means for discharging exhaust gas from the upper compartment of the cylindrical vessel.

The above-described process and apparatus of the present invention are suitable for producing urea granules having a relatively large uniform size and, therefore, suitable for the bulk blend fertilizer, without formation of large agglomerations of the urea granules.

DETAILED DESCRIPTION OF THE INVENTION

Figure 1:
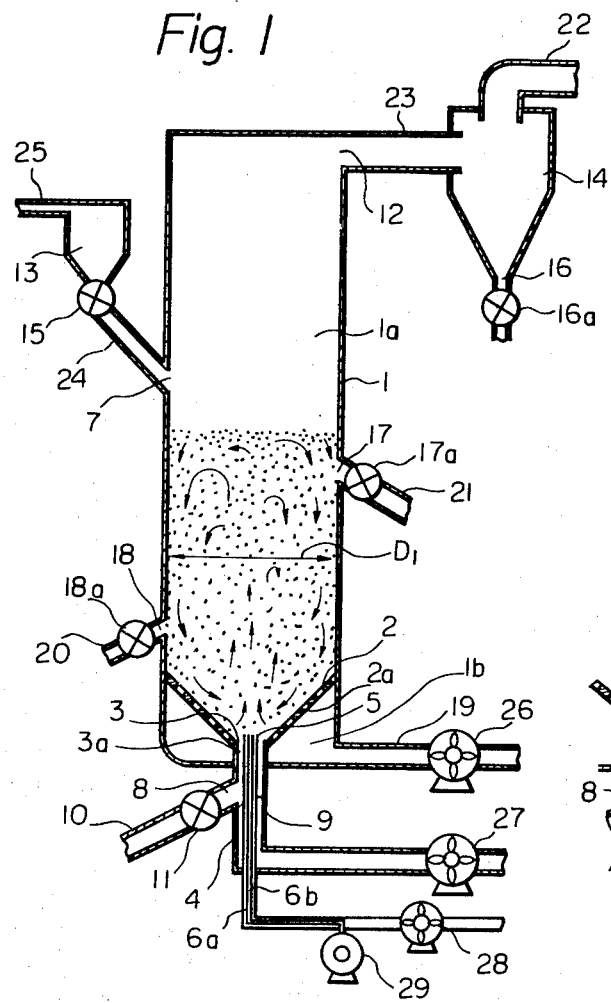
FIG. 1 is an explanatory cross-sectional view of an embodiment of the apparatus of the present invention.

In the process of the present invention, the urea granules are produced in a fluidized bed which is formed in an upper portion of a vertical cylindrical region portitioned from a lower portion thereof by means of a funnel-shaped partition converging toward a bottom thereof and having a number of holes formed thereon. That is, the upper portion is connected to the lower portion through the holes of the funnel-shaped partition.

The term "urea granules" used herein refers to a granule which consists of urea alone or a mixture of urea with an additive, or which is composed of a core consisting of urea alone or a mixture of urea and an additive and a coating layer consisting of a solid material different from the core-forming material.

The term "vertical cylindrical region" used herein may involve a vertical polygonal prismatic region, for example, a vertical hexagonal or octagonal prismatic region.

The term "funnel-shaped partition" used herein refers not only to an inverted circular cone-shaped partition but also to an inverted polygonal pyramid-shaped partition, for example, an inverted hexagonal or octagonal pyramid-shaped partition. In the case of the polygonal pyramid-shaped partition, it is preferable that the edges of the pyramid be rounded.

In the process of the present invention, the fluidized bed is formed by the operations of:

(A) feeding solid seed particles of urea into the upper portion of the cylindrical region;

(B) atomizing and injecting upward a stream of a liquid containing a material to be incorporated onto the urea seed particles, into the upper portion of the cylindrical region through a nozzle having a top end thereof located just above a center of the bottom of the funnel-shaped partition, the liquid being forwarded to the nozzle through a path extending through the lower portion of the cylindrical region;

(C)-(1) blowing a number of streams of an inert gas, not reactive to urea and the liquid, and having a temperature of from 50° to 98° C., from the lower portion into the upper portion of the cylindrical region through the holes of the funnel-shaped partition, and (C)-(2) blowing upward a stream of an inert gas, not reactive to urea and the liquid, and having a temperature of from 30° to 120° C. into the upper portion of the cylindrical region through an annular opening formed in the bottom of the partition and surrounding the atomizing nozzle of the liquid, the inert gas being introduced to the annular opening through a path extending through the lower portion of the cylindrical region.

When the fluidized bed is formed in the upper portion of the cylindrical region, the urea seed particles and the atomized liquid droplets are uniformly fluidized and allowed to adhere to each other, and the liquid is dried or solidified so as to grow the urea particles.

It is important in the process of the present invention, that the urea seed particles, which serve as nucleuses on which layers of the material to be incorporated grow, are fed into the upper portion of the cylindrical region. It is preferable that the urea seed particles have a size of 0.35 mm or more, more preferably, from 0.5 to 2.5 mm, and even more preferably, from 1.0 to 2.0 mm. When the size of the urea seed particles is smaller than 0.35 mm, it is sometimes difficult for the seed particles to serve as nucleuses. This difficulty causes the control of the size of the resultant urea granules to be difficult. Therefore, in such a case, sometimes a number of the urea particles and the atomized liquid droplets are adhered to each other, so as to form large size of agglomeration in the fluidized bed. The above-mentioned phenomena will cause the size of the resultant urea granules to be remarkably uneven and the granulating effect to be poor.

The urea seed particles can be fed from any location in the upper portion of the cylindrical region into the fluidized bed. However, it is preferable that the urea seed particles be fed at a location above the uppermost end of the funnel-shaped partition, more preferably, above the fluidized bed. This is because the urea seed particles can naturally fall down and can be uniformly dispersed into the fluidized bed without the blowing of a gas for dispersing the particles. Therefore, the feed of the urea seed particles can be easily effected while stably maintaining the fluidized bed.

The urea seed particles usable for the process of the present invention can be prepared by any conventional method for making solid urea particles. However, usually, it is preferable that the urea seed particles be prepared by an atomize-granulating method.

In the process of the present invention, it is important that a liquid containing a material to be incorporated onto the urea seed particles is atomized and injected vertically upward through an atomizing nozzle which extends through the center of the bottom of the funnel-shaped partition and which has a top end located just above the center. The liquid is fed into the nozzle through a path extending through the lower portion of the cylindrical region and connected to a supply source of the liquid. This atomizing operation for the liquid may be carried out by any one of the conventional atomizing methods. For example, the liquid may be atomized by the action of a jet stream of an inert gas not reactive to urea and the liquid.

The fed urea seed particles and the atomized liquid droplets are fluidized by the action of a number of streams of the inert gas blown through the holes of the funnel-shaped partition and a stream of the inert gas blown through the annular opening formed in the bottom of the funnel-shaped partition and surrounding the atomizing nozzle. In the thus formed fluidized bed, the urea seed particles and the atomized liquid droplets are uniformly fluidized even in the peripheral portion of the cylindrical region and in the portion close to the upper surface of the funnel-shaped partition. Therefore, these particles are prevented from being undesirably deposited onto the side wall of the cylindrical vessel and the upper surface of the funnel-shaped partition. The uniform fluidized bed is also effective for preventing the undesirable formation of the large agglomerations of the urea particles and the liquid droplets. In the fluidized bed, the urea seed particles, the atomized liquid droplets and the resultant granules are uniformly circulated in a convection-like circuit. That is, the particles which have moved along the upper surface of the funnel-shaped partition and, then, come to a position above the annular opening, are rapidly blown upward by the stream of the inert gas blown through the annular opening. Therefore, the space density of the particles around the annular opening and the atomizing nozzle, is smaller than that in the other parts of the upper portion. This loose space density is effective for smoothly atomizing the liquid ejected from the nozzle to form very fine liquid droplets which were never obtained in the conventional processes. In this case, it is important that the atomizing nozzle is projected into the inside of the upper portion of the cylindrical region through the bottom of the funnel-shaped partition. That is, the top end of the atomizing nozzle is located just above the level of the annular opening. If the top end of the atomizing nozzle is located at the same level as or below that of the annular opening, the atomized liquid droplets will directly adhere to the urea seed particles brought to a position above of the annular opening before the liquid droplets are blown by the stream of the inert gas blown through the annular opening. This phenomenon will cause a number of the particles of urea and the liquid to be incorporated into each other so as to form large size of agglomerates, and the grannulating effect to be reduced. The atomizing and injecting operation of the liquid at a location just above the level of the annular opening can eliminate not only all of the above-mentioned disadvantages but, also, the afore-mentioned defects of the conventional urea granulating processes. It is preferable that the distance between the top end of the atomizing nozzle and the bottom of the funnel-shaped partition, namely the level of the annular opening, be equal to or smaller than the outer diameter of the annular opening. If the above-mentioned distance is excessively large, the atomized liquid droplets may sometimes not be rapidly blown by the action of the stream of the brown inert gas from the annular opening. This phenomenon will result in insufficient drying or solidifying of the liquid, in a slow granulating rate and in unevenness in the size of the resultant granules. Also, large size of agglomerations may be formed in the fluidized bed, and a considerable amount of deposit may be formed on the wall surface of the cylindrical vessel and the upper surface of the funnel-shaped partition.

The liquid containing a material to be incorporated onto the urea seed particles may be an aqueous solution of urea. In this case, it is preferable that the aqueous solution contain 50 to 95% by weight, more preferably, 70 to 85% by weight, of urea and that the aqueous solution have a temperature of from 50° to 130° C., more preferably, from 80° to 110° C. If the concentration of urea in the aqueous solution is excessively low, the calories necessary for drying the solution will be too large. In this case, the granulating capacity will be too low. When the aqueous solution has an excessively high concentration of urea, the drying up of the solution will be effected excessively rapidly. Therefore, the adhering efficiency of the atomized solution droplets to the urea seed particles will become too low. Also, the rapid drying of urea solution may promote the formation of undesirable biuret. The feed rate of the urea solution may be adjusted depending upon the concentration of urea in the aqueous solution, the temperature of the aqueous solution, the feed rate of the urea seed particles, and the discharge rate of the resultant urea granules.

The urea aqueous solution may contain, as an additive, formaldehyde or an urea-formaldehyde condensation product. The additive is effective for enhancing the crushing hardness strength of the resultant urea granules and for preventing the agglomeration of the resultant granules to each other. Also, when 0.1 to 30%, based on the weight of urea, of formaldehyde is added to the urea aqueous solution, it can be expected that the atomized liquid droplets will exhibit a high adhering efficiency to the urea seed particles.

Furthermore, the urea seed particles may be coated with various materials which are effective for converting the urea fertilizer to a slow releasing nitrogen fertilizer. The material may be sulphur or a polyolefin. In this case, a melt of sulphur or polyolefin having a temperature of from 125° to 160° C. is fed to the atomizing nozzle. The atomized sulphur or polyolefin melt droplets adhere to the urea seed particles and are solidified on the particles so as to form coating layers covering the urea seed particles.

The average temperature of the fluidized bed formed in the upper portion of the cylindrical region is variable depending upon the temperatures and amounts of the atomized liquid droplets, the urea seed particles, the inert gas blown through the holes of the funnel-shaped partition, the inert gas blown through the annular opening in the bottom of the funnel-shaped partition and the inert gas used for atomizing the liquid. However, it is important to maintain the average temperature of the fluidized bed in a range of from 50° to 100° C., preferably, from 60° to 80° C. If the average temperature of the fluidized bed is lower than 50° C., it will be difficult to dry or solidify the liquid at a proper speed, and sometimes the agglomeration of the urea particles and the atomized liquid droplets is promoted. If the average temperature of the fluidized bed is higher than 100° C., the adhering efficiency of the atomized liquid droplets to the urea seed particles will be decreased, the urea particles will be deposited on the wall surface of the cylindrical vessel and the content of biuret in the resultant urea granules will increase.

The temperature of the inert gas blown through the annular opening is variable depending upon the temperature, and amount of the atomized liquid, concentration of urea in the urea aqueous solution and the average temperature of the fluidized bed. However, it is important that the stream of the inert gas blown through the annular opening has a temperature in a range of from 30° to 120° C., preferably, from 60° to 110° C. When the temperature is lower than 30° C., it will become difficult to simultaneously carry out the drying or solidifying operation and the granulating operation in the fluidized bed. Also, if the temperature is higher than 120° C., the atomized liquid droplets will be so rapidly dried or solidified that the adhering efficiency of the atomized liquid droplets to the urea seed particles will be greatly reduced. Also, the high temperature of the blown inert gas will cause the formation of biuret from urea to be promoted. In the case where the temperature of the inert gas blown through the annular opening is in the above-mentioned range, the resultant urea granules can be completely dryed or solidified at a proper rate and the resultant urea granules do not deposit on or adhere to the path for discharging them from the fluidized bed.

In the case where an aqueous solution containing a high concentration of urea is atomized and injected into the fluidized bed, it is possible to use steam as an inert gas for atomizing the urea solution. The steam is effective for controlling the drying rate of the urea solution. When the concentrated urea solution is atomized into the fluidized bed through the atomizing nozzle which is located in a lower part having a relatively low temperature, a portion of the urea dissolved in the aqueous solution is crystallized and deposited in the core pipe. This deposited urea sometimes may close the top end of the nozzle. In order to prevent the deposit of urea, it is advantageous that the urea solution be atomized by a jet stream of steam, which has a large latent heat of evaporation and which is capable of dissolving urea therein. Also, it is advantageous for the atomizing operation that the steam have a high pressure and can atomize the urea solution even without using a compressor. In the atomizing operation in the process of the present invention, the steam preferably has a temperature in a range of from 110° C. to 130° C. and a pressure of 0.5 kg/cm²G or more. The use of steam as an inert gas for atomizing the urea solution might cause the adhering efficiency to be slightly reduced. However, the fine urea particles discharged together with the exhaust gas have a relatively large size, and therefore, can be easily separated and completely recovered from the exhaust gas.

The temperature of the inert gas blown through the numerous holes of the funnel-shaped partition is in a range of from 50° to 98° C., preferably, from 60° to 90° C. If the temperature is lower than 50° C., the atomized liquid droplets will not be dried or solidified at a proper rate. If the temperature is higher than 98° C., the atomized liquid droplets will be rapidly dried or solidified and the resultant solid particles will be deposited on the peripheral wall surface of the cylindrical vessel or the upper surface of the funnel-shaped partition.

Each of the inert gases to be blown through the holes of the funnel-shaped partition, the annular opening and the inert gas to be used for atomizing the liquid may be different from each other or the same as each other, as long as the inert gases are suitable for attaining the objects of the present invention. Each inert gas may be selected from the group consisting of air, nitrogen gas, carbon dioxide gas and mixtures of two or more of the above mentioned gases, which gases are not reactive to urea and the liquid containing, for example, urea, sulphur and polyolefin.

In the case where the liquid is an urea aqueous solution containing a small amount of formaldehyde, and the atomizing operation is carried out by using a dry gas, such as nitrogen gas and carbon dioxide gas, the resultant urea granules sometimes have a rough surface. In such a case, it is preferable that the atomizing operation be carried out by using an atomizing gas containing steam. Steam is effective for the formation of smooth surfaced urea granules.

In the process of the present invention, it is preferable that the stream of the inert gas blown through the annular opening have a linear velocity $U_j$ in m/sec larger than an average superficial velocity $U_o$ in m/sec of the inert gas mixture in the upper portion of the cylindrical region.

The term "inert gas mixture", used above, refers to a mixture of the inert gas blown through the numerous holes of the funnel-shaped partition, the inert gas blown through the annular opening and the inert gas used for atomizing and injecting the liquid containing the material to be incorporated onto the urea seed particles. The inert gas mixture is provided in the upper portion of the cylindrical region and forms a fluidized bed in the upper portion. The average superficial velocity $U_o$ of the inert gas mixture in the fluidized bed is calculated in accordance with the equation:

$$U_o = V_o/m_1$$

wherein $V_o$ represents a total flow rate in m³/sec of the inert gas mixture fed into the upper portion of the cylindrical region, and $m_1$ represent a cross-sectional area in m² of the vertical cylindrical region and is calculated from the formula:

$$m_1 = \pi D_1 2/4$$

wherein $D_1$ represent a diameter of the vertical cylindrical region. The value of $V_o$ can be determined by converting the values of the total flow rate $V_n$ of the streams of the inert gas blown through the holes of the funnel-shaped partition, the flow rate $V_j$ of the inert gas stream blown through the annular opening and the flow rate $V_a$ of the inert gas stream blown for atomizing the liquid, respecting, into the values of the flow rates at the average temperature and the average pressure of the fluidized bed, and by calculating a sum of the converted values of the flow rates. By blowing the inert gas through the annular opening at a linear velocity $U_j$ larger than the average superficial velocity $U_o$ of the inert gas mixture, a forced circulation of the urea seed particles and the atomized liquid droplets is formed in a convection circuit form. This convection circuit-formed circulation is effective for forming a uniform fluidized bed. Accordingly, it is very preferable that $U_j$ be larger than $U_o$. More preferably, $U_j$ is in a range of from 4 to 10 times $U_o$, and even more preferably, from 5 to 8 times $U_o$. However, if the value of $U_j$ is excessively large, the stream of the blown inert gas flows only upward and does not cause the forced circulation of the urea seed particles and the atomized liquid droplets to be created. Also, when the value of Uj is too small, it is impossible to create the fluidized bed, and the urea seed particles and the liquid droplets form a number of large agglomerations. The value of Uj in m/sec can be determined by the equation:

$$Uj = Vj/m_2$$

wherein Vj represents a value of flow rate (m³/sec) of the inert gas in the annular opening and $m_2$ represents a value of area in m² of the annular opening.

Also, it is preferable that the flow rate Vj in m³/sec of the inert gas stream blown through the annular opening correspond to 10 to 70%, more preferably, from 20 to 50% of the total flow rate Vo in m³/sec of the inert gas mixture blown into the upper portion of the cylindrical region. If the flow rate Vj is excessively large, the stream of the blown inert gas may create a spouted bed-like condition in the upper portion or the blown inert gas flows only upward without the formation of the convection circuit-like circulation. Accordingly, the atomized liquid can not be dried at a proper drying rate. This phenomenon causes the urea seed particles and the liquid droplets to adhere and deposit on the wall surface of the vertical vessel and the upper surface of the funnel-shaped partition. Also, an excessively small value of the flow rate Vj may result in difficulty in the formation of the fluidized bed effective for making the urea granules and in drying the atomized liquid at a proper drying rate. In order to dissolve the above-mentioned difficulty, it is necessary to reduce the feed rate of the liquid to be atomized. This reduction in the feed rate of the liquid will result in reduction of the granulating capacity.

Furthermore, it is preferable that the average superficial velocity Uo in m/sec of the inert gas mixture in the fluidized bed be in a range of from 1.5 to 8.0 times, more preferably, from 1.7 to 3.0 times, a minimum fluidization velocity Umf in m/sec of the inert gas mixture for fluidizing the urea seed particles. The minimum fluidization velocity Umf is variable depending the average size of the urea seed particles fed. However, usually, the average superficial velocity Uo is in a range of from 1.5 to 2.5 m/sec. When the value of Uo is less than 1.5 times Umf, sometimes the particles in the fluidized bed can not more vigorously, and therefore, it may be impossible to maintain an effective fluidized bed. Also, if the value of Uo is larger than 8 times Umf, the movement of the particles in the fluidized bed may be excessively vigorous. This vigorous movement will cause the resultant urea granules to crush against each other at a high speed and to be smashed into fine particles.

The stream of the inert gas blown through the annular opening cooperates with the numerous streams of the inert gas blown through the numerous holes of the funnel-shaped partition so as to create a circulation flow of the urea particles. This circulation flow is initially forwarded vertically upward along the longitudinal axis of the cylindrical region. Then, the direction of the circulation flow is turned so that the urea particles flow downward the along the peripheral inside surface of the upper portion of the cylindrical region, and then, along the upper surface of the funnel-shaped partition so as to approach the annular opening.

When the liquid is atomized and injected through the nozzle, the atomized liquid droplets flow upwardly and diffuse into the vertically upward stream of the inert gas. In this case, it is preferable that the liquid be atomized in the form of a cone having a vertical angle of 45°. The atomizing operation can be effected by any method, for example: by a method in which a core pipe-in-sheath pipe type pneumatic nozzle is used, and the liquid is injected through the core pipe and a compressed inert gas is jetted through an annular space formed between the core and sheath pipes; a method in which the liquid is injected through a single pipe under a high pressure, or; a method in which a mixture of the liquid and an inert gas is injected through a single pipe.

When the urea seed particles are fed into the fluidized bed, a portion of the fed urea seed particles is carried upward by the stream of the inert gas blown through the annular opening. Accordingly, while the atomized liquid droplets flow upward together with the stream of the inert gas, the atomized liquid droplets are allowed to adhere to the outer surfaces of the urea seed particles. That is, a cylindrical granulating zone is formed in the axial portion of the upper portion of the cylindrical region. In this case, the space density of the urea seed particles in the granulating zone is smaller than that in other portions of the upper portion of the cylindrical region. Accordingly, the liquid layers formed on the urea seed particles are dried or solidified while circulating in the upper portion of the cylindrical region without agglomeration. When the resultant urea granules reach the desired size, it becomes impossible for the stream of the inert gas blown through the annular opening to support the resultant urea granules. Therefore, the resultant urea granules can fall down through the annular opening into the path for introducing the inert gas to the annular opening. The fallen down urea granules are discharged and recoverd from the path for the inert gas. The urea granules are separated from the inert gas by means of a perforated plate disposed in the path for the inert gas and inclined from a horizontal plane. The perforated plate permit only the inert gas to pass therethrough but does not permit the urea granules having a desired size to pass therethrough. Even when a portion of the urea particles having a size smaller than the desired size falls down onto the perforated plate, the particles are not permitted to pass through the perforated plate and are blown up into the upper portion of the cylindrical region by the flow of the inert gas. The perforated plate also serves as a guide for introducing the separated urea granules into means for collecting them.

The exhaust gas from the fluidized bed in discharged through a top end of the cylindrical region. When the exhaust gas contains small particles of urea and the dried or solidified liquid, these small particles may be separated and recovered from the exhaust gas by any method, for example, by using a cyclone. The recovered particles can be reused for the process of the present invention.

The apparatus of the present invention will now be illustrated in detail by referring to the accompanying drawings.

Figure 2:
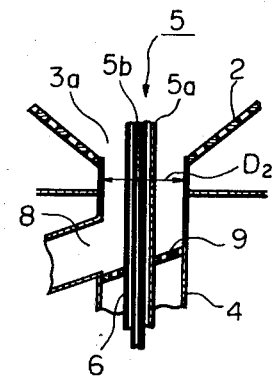
FIG. 2 is an explanatory cross-sectional view of an embodiment of a nozzle usable for the apparatus of the present invention.

Referring to FIGS. 1 and 2, a vertical cylindrical vessel 1 having an inside diameter $D_1$ is partitioned into an upper compartment 1a and a lower compartment 1b by means of a funnel-shaped partition 2. The funnel-shaped partition 2 converges toward a bottom 3 thereof and has a number of holes 2a through which the lower compartment 1b is connected to the upper compartment 1a. The lower compartment 1b is also connected to a supply source (not shown) of an inert gas through a conduit 19 and a blower 26.

An end of a conduit 4 having an inside diameter $D_2$ is connected to the bottom 3 of the funnel-shaped partition 2 so that the conduit 4 is directly communicated to the upper compartment 1a. An opposite end of the conduit 4 is connected to a supply source of an inert gas (not shown in FIG. 1) through a blower 27.

An atomizing nozzle 5 is located along the longitudinal axis of the conduit 4 in such a manner that the top end of the nozzle 5 is located just above the bottom 3 of the funnel-shaped partition, that is, the level of the top end of the conduit 4. An annular opening 3a is formed around the nozzle 5.

Referring to FIGS. 1 and 2, the nozzle 5 has a sheath pipe 5a and core pipe 5b inserted into the sheath pipe 5a. The sheath pipe 5a is connected to a supply source of an inert gas (not shown in FIG. 1) through a conduit 6a and a blower 28. The core pipe 5b is connected to a supply source (not shown) of a liquid containing a material to be incorporated to the urea seed particles, through a conduit 6b and a pump 29.

The conduit 4 is provided with a discharging conduit 8 branched from the conduit 4. The discharging conduit 8 is connected to a conduit 10 through a control device 11 for adjusting the discharge rate of the resultant urea granules. In the conduit 4, an inclined perforated plate 9 is arranged in such a manner that the resultant urea granules can be introduced into the conduit 8. The perforated plate 9 has a number of holes having a size small enough for not allowing the resultant urea granules having a desired size to pass through the holes. Accordingly, when the resultant urea granules reach the perforated plate 9, only those having the desired size can be introduced into the conduit 8 along the upper surface of the perforated plate 9, and the remaining particles in the conduit 4 are blown up into the upper compartment 1a through the annular opening 3a by the action of the stream of the inert gas flowing through the conduit 4. That is, the resultant urea granules having the desired size are separated from the other particles by utilizing a principle of gas elutriation in the conduit 4. The control device 11 is effective not only for controlling the discharge rate of the resultant urea granules but, also, for promoting the separation of the resultant urea granules from the other particles on the perforated plate 9. The control device 11 is not limited to a special type. However, it is preferable to use a rotary valve as the control device 11.

The inclination of the perforated plate 9 from a horizontal plane is not limited to a special range of angles. However, it is preferable that the angle of the perforated plate 9 from the horizontal plane be in a range of from 5 to 50 degrees, more preferably, from 15 to 45 degrees. When the perforated plate 9 is inclined from the horizontal plane the perforated plate 9 takes an elliptical shape.

The upper portion 1a is provided with an inlet 7 for feeding urea seed particles into the upper portion 1a. A hopper 13 for containing the urea seed particles is connected to the inlet 7 through a conduit 24. A feed regulator 15 for adjusting the feed rate of the urea seed particles is located between the bottom of the hopper 13 and the conduit 24. The urea seed particles are supplied to the hopper 13 through a conduit 25. The inlet 7 may be located in any location above the uppermost end of the funnel-shaped partition 2, preferably above a zone in which the fluidized bed is formed.

An exhaust gas discharging outlet 12 of the cylindrical vessel 1 is connected through a conduit 23 to a cyclone 14, for separating and recovering small solid particles from the exhaust gas. The cyclone 14 has an outlet 16 arranged in the bottom thereof, a discharge valve 16a arranged at the outlet and a conduit 22 for discharging the exhaust gas therethrough. The upper compartment 1a is provided with an outlet 17 for discharging a portion of the particles in the fluidized bed. The outlet 17 is located in a upper part of the fluidized bed-forming zone in the upper compartment 1a. The outlet 17 is connected to a conduit 21 through a valve 17a for adjusting the discharging rate of the particles and screening the particles having a predetermined size. Also, the upper compartment 1a is provided with an outlet 18 for sampling the particles in the fluidized bed. The outlet 18 is located in a lower part of the upper portion 1a and connected to a conduit 20 through a valve 18a.

In the apparatus of the present invention, the vertical vessel 1 preferably has a cylindrical shape. However, the vessel 1 may take a polygonal prismatic shape, for example, a hexagonal or octagonal prismatic shape. The portion 2 has a funnel like shape. It is preferable that the funnel-shape have a vertical angle of from 60 to 130 degrees, more preferably, from 80 to 100 degrees. When the vertical angle is larger than 130 degrees, sometimes the fluidized bed may be uneven. This uneven fluidized bed causes a portion of the urea seed particles to be not fluidized. When the vertical angle is smaller than 30, sometimes the movement of the urea seed particles may be excessively vigorous and, therefore, the circulation of all of the particles may not be formed in a desired circuit in the fluidized bed.

In the apparatus of the present invention, it is important that the top end of the atomizing nozzle 5 be located above the level of the top end of the conduit 4. It is preferable that the distance between the top end of the atomizing nozzle 5 and the level of the top end of the conduit 4 be equal to or smaller than the inside diameter $D_2$ of the conduit 4.

Also, it is preferable that the ratio ($m_2/m_1$) of a cross-sectional area in $m^2$ of the cylindrical vessel 1 ($m_1 = \pi D_1^2/4$) to an effective area in $m^2$ of the annular opening 3a ($m_2 = \pi D_2^2/4$ —cross-sectional area of atomizing nozzle 5) be in a range of from 0.01 to 0.25, more preferably, from 0.03 to 0.1. The ratio ($m_2/m_1$) in the range mentioned above is effective for forming a stable, uniform fluidized bed in the upper portion 1a. Furthermore, it is preferable that the ratio ($D_2/D_1$) of the outer diameter ($D_2$) of the annular opening 3a, that is, the inside diameter of the top end of the conduit 4, to the inside diameter ($D_1$) of the cylindrical vessel 1 be in a range of from 1/10 to ½, more preferably, from 1/6 to ⅓.

By using the process and apparatus of the present invention, it is possible to produce urea granules having a size of from 1.2 to 10 times, preferably, from 2 to 4 times, the size of the seed particles without difficulty. The ratio of the size of the seed particles to that of the resultant urea granules is variable depending upon the size of the seed particles. The resultant urea granules are usable as urea seed particles for producing larger urea granules. That is, the process and apparatus of the present invention has an advantage that it is possible to easily produce the urea granules having a desired size which is suitable for the use of the urea granules.

The process and apparatus of the present invention can be used for coating urea seed particles with sulphur or polyolefin. In the case of sulphur coating, a sulphur melt having a temperature of from 125° to 160° C. is atomized and injected into the upper compartment 1a. The nozzle and conduit for the sulphur melt should be made of a material resistant to the sulphur melt and have a structure suitable for atomizing the sulphur melt. The thickness of the sulphur coating layer can be controlled by regulating the feed rates of the seed particles and the sulphur melt.

In the case of sulphur coating, it is important that the average temperature of the fluidized bed be adjusted to and maintained in a range of from 60° to 80° C.

The features and advantages of the present invention will now be illustrated in detail by the following examples. In the examples, urea solid particles having a size of from 0.5 to 1.0 mm, a hardness of 0.14 kg, a total content of nitrogen of 46.41% by weight, a content of nitrogen in the state of biuret of 0.37% by weight and a content of water of 0.15% by weight, were used as seed particles. The urea seed particles were produced by a atomize granulating process.

In each example, the inert gas to be blown through the holes of the funnel-shaped partition, the inert gas to be blown through the annular opening, and the inert gas to be used for atomizing a liquid containing a material to be incorporated onto the seed particles were all air heated, respectively, to a predetermined temperature.

In each example, the adhering efficiency E of the liquid to the seed particles was calculated in accordance with the equation:

$$E(\%) = (W_1/W_2 + W_3) \times 100$$

wherein $W_1$ represents a discharge rate in kg/hr of the resultant urea granules, $W_2$ represents a feed rate in kg/hr of the urea seed particles and $W_3$ represents a feed rate of the liquid calculated in terms of the material to be incorporated to the seed particles.

EXAMPLE 1 through 4

The same type of a granulating apparatus as that illustrated in FIGS. 1 and 2 was used in each of Examples 1 through 4. In the apparatus, the inside diameter $D_1$ of the cylindrical vessel 1 was 204 mm, the height of the cylindrical vessel 1 from the level of the annular opening 3a was 2600 mm, the outer diameter of the annular opening 3a was 52.9 mm, the outside diameter of the sheath pipe 5a was 13.2 mm, the funnel-shaped partition 2 had 1300 holes, each having a diameter of 1.2 mm and a vertical angle of 90 degrees, the perforated plate 9 was arranged at an inclination angle of 30 degrees from the horizon in the conduit 4 and consisted of a net in which warp wires having a thickness of 0.6 mm and weft wires having a thickness of 0.6 mm were arranged at intervals of 1.1 mm, respectively, the inlet 7 of the seed particles was located 400 mm above the level of the annular opening 3a, and the distance between the top end of the nozzle 5 and the level of the annular opening 3a was 3.5 mm.

Procedures for producing urea granules by using urea seed particles and a urea aqueous solution were carried out under the conditions as shown in Table 1. The procedures could be effected without any difficulty. The results of Examples 1 through 4 are shown in Table 1.

Table 1

| Example No. | 1 | 2 | 3 | 4 |
|---|---|---|---|---|
| Condition | | | | |
| Feed rate of urea seed particle (kg/hr) | 1.5 | 0.45 | 0.45 | 1.0 |
| Concentration of urea aqueous solution (% by weight) | 80 | 75 | 85 | 90 |
| Feed rate of urea aqueous solution (kg/hr) | 13.77 | 10.94 | 9.48 | 12.69 |
| Temperature of urea aqueous solution (°C.) | 106 | 103 | 102 | 126 |
| Feed rate of air blown through holes of funnel-shaped partition (Nl/sec) | 29.3 | 28.6 | 30.8 | 29.4 |
| Temperature of air blown through holes of funnel-shaped partition (°C.) | 76 | 91 | 95 | 56 |
| Feed rate of air blown through annular opening (Nl/sec) | 16.8 | 16.2 | 17.1 | 17.1 |
| Temperature of air blown through annular opening (°C.) | 76 | 65 | 70 | 63 |
| Linear velocity (Uj) of air stream blown through annular opening (m/sec) | 10.5 | 9.8 | 10.5 | 10.3 |
| Feed rate of air blown for atomizing urea solution (Nl/sec) | 1.25 | 1.25 | 1.25 | 1.33 |
| Temperature of atomizing air (°C.) | 105 | 105 | 102 | 114 |
| Average amount of particles in fluidized bed (kg) | 6.28 | 6.05 | 5.75 | 6.18 |
| Average superficial velocity (Uo) of air in fluidized bed (m/sec) | 1.76 | 1.72 | 1.88 | 1.78 |
| Ratio (Uo/Umf) | 2.6 | 1.8 | 1.9 | 2.2 |
| Average temperature of fluidized bed (°C.) | 62 | 62 | 76 | 62 |
| Temperature of exhaust gas (°C.) | 57 | 58 | 70 | 57 |
| Result | | | | |
| Adhering efficiency of urea solution to seed particles (%) | 89 | 87 | 89 | 83 |
| Average size of recovered urea granules through conduit 10 (mm) | 2.09 | 3.05 | 3.10 | 2.49 |
| Amount of urea deposited on inside wall surface of cylindrical vessel and upper surface of partition during 10 hour granulating operation | none | none | none | none |

In Example 1, the resultant urea granules had a total content of nitrogen of 46.65% by weight, a content of nitrogen in the state of biuret of 0.42% by weight, a content of water of 0.02% by weight and a hardness of 1.2 kg.

EXAMPLES 5 and 6

In each of Examples 5 and 6, the similar procedures to those described in Example 1 were carried out, except that the urea aqueous solution was atomized by using steam, and in Example 6, the urea aqueous solution contained 2.0% by weight of formaldehyde. The conditions of the granulating operation are shown in Table 2. The results of Examples 5 and 6 are also shown in Table 2. The resultant urea granules of Examples 5 and 6 exhibited a hardnesses of 1.0 and 2.7 kg, respectively.

Table 2

| Example No. | 5 | 6 |
|---|---|---|
| Condition | | |

Table 2-continued

| Example No. | 5 | 6 |
|---|---|---|
| Feed rate of urea seed particle (kg/hr) | 1.5 | 1.75 |
| Concentration of urea aqueous solution (% by weight) | 80 | 85 |
| Feed rate of urea aqueous solution (kg/hr) | 16.7 | 16.7 |
| Temperature of urea aqueous solution (°C.) | 113 | 113 |
| Feed rate of air blown through holes of funnel-shaped partition (Nl/sec) | 29.3 | 29.5 |
| Temperature of air blown through holes of funnel-shaped partition (°C.) | 77 | 77 |
| Feed rate of air blown through annular opening (Nl/sec) | 16.8 | 16.8 |
| Temperature of air blown through annular opening (°C.) | 76 | 76 |
| Linear velocity ($U_j$) of air stream blown through annular opening (m/sec) | 10.5 | 10.5 |
| Feed rate of air blown for atomizing urea solution (Nl/sec) | 1.38 | 1.38 |
| Temperature of atomizing steam (°C.) | 117 | 117 |
| Average amount of particles in fluidized bed (kg) | 6.3 | 6.2 |
| Average superficial velocity ($U_o$) of air in fluidized bed (m/sec) | 1.80 | 1.81 |
| Ratio ($U_o/U_{mf}$) | 2.3 | 2.5 |
| Average temperature of fluidized bed (°C.) | 65 | 65 |
| Temperature of exhaust gas (°C.) | 62 | 62 |
| Result | | |
| Adhering efficiency of urea solution to seed particles (%) | 83 | 96 |
| Average size of recovered urea granules through conduit 10 (mm) | 2.40 | 2.28 |
| Amount of urea deposited on inside wall surface of cylindrical vessel and upper surface of partition during 10 hour granulating operation | none | none |

EXAMPLES 7 and 8

Procedures similar to those described in Example 1 were carried out in each of Examples 7 and 8, except that the urea aqueous solution was replaced by a sulphur melt. The sulphur melt was fed into the upper compartment 1a under the conditions shown in Table 3. The urea seed particles which had been produced by the process of the present invention, had a size of from 2.83 to 2.84 mm.

The average content of the sulphur in the resultant urea granulas was determined. Also, the resultant urea granules were immersed in water at a temperature of 38° C. for 24 hours. The amount of urea dissolved into the water through the sulphur coating layers was measured. The same measurement of the dissolved urea as that mentioned above was carried out after the immersion was carried out for 14 days. The results of Examples 7 and 8 are shown in Table 3.

Comparative Examples 1 through 3

In each of Comparison Examples 1 through 3, procedures similar to those described in Example 1 were carried out, except that the granulating conditions were those shown in Table 4.

In Comparative Example 1, the temperature of air blown through the holes of the funnel-shaped partition was 109° C., which falls outside of the scope of the present invention. The average temperature of the fluidized bed was maintained at 105° C. by externally heating the cylindrical vessel.

In Comparative Example 2, the temperature of air blown through the holes of the funnel-shaped partition was 110° C. which falls outside of the scope of the present invention.

In Comparison Example 3, the air blown through the annular opening had a temperature of 135° C. which falls outside of the scope of the present invention.

The results of Comparison Examples 1 to 3 are shown in Table 4.

Table 3

| Example No. | 7 | 8 |
|---|---|---|
| Condition | | |
| Feed rate of sulpher melt (kg/hr) | 11.1 | 9.8 |
| Temperature of sulpher melt (°C.) | 148 | 159 |
| Feed rate of air blown through holes of funnel-shaped partition (Nl/sec) | 32.4 | 32.5 |
| Temperature of air blown through holes of funnel-shaped partition (°C.) | 54 | 54 |
| Feed rate of air blown through annular opening (Nl/sec) | 19.2 | 19.3 |
| Temperature of air blown through annular opening (°C.) | 125 | 120 |
| Linear speed ($U_j$) of air stream blown through annular opening (m/sec) | 13.7 | 13.6 |
| Feed rate of nitrogen blown for atomizing sulpher melt (Nl/sec) | 1.52 | 1.52 |
| Temperature of atomizing nitrogen (°C.) | 146 | 152 |
| Average amount of particles in fluidized bed (kg) | 5.5 | 5.0 |
| Average superficial velocity ($U_o$) of air in fluidized bed (m/sec) | 2.04 | 2.03 |
| Ratio ($U_o/U_{mf}$) | 1.9 | 1.9 |
| Average temperature of fluidized bed (°C.) | 70 | 67 |
| Temperature of exhaust gas (°C.) | 67 | 64 |
| Result | | |
| Adhering efficiency of sulpher to seed particles (%) | 92 | 99.9 |
| Average content of sulpher in urea granules (%) | 15.7 | 23.6 |
| Amount of urea dissolved in water at 38° C. | | |
|   24 hour immersion | 29.5 | 4.7 |
|   14 day immersion | 45.2 | 10.2 |

Table 4

| Comparative Example No. | 1 | 2 | 3 |
|---|---|---|---|
| Condition | | | |
| Feed rate of urea seed particle (kg/hr) | 0.35 | 0.40 | 0.80 |
| Concentration of urea aqueous solution (% by weight) | 85 | 85 | 70 |
| Feed rate of urea aqueous solution (kg/hr) | 5.30 | 6.69 | 11.84 |
| Temperature of urea aqueous solution (°C.) | 105 | 104 | 105 |
| Feed rate of air blown through holes of funnel-shaped partition (Nl/sec) | 26.1 | 25.7 | 29.0 |
| Temperature of air blown through holes of funnel-shaped partition (°C.) | 109 | 110 | 92 |
| Feed rate of air blown through annular opening (Nl/sec) | 15.2 | 15.4 | 16.3 |
| Temperature of air blown through annular opening (°C.) | 105 | 110 | 135 |
| Linear velocity (Uj) of air stream blown through annular opening (m/sec) | 10.3 | 10.5 | 11.9 |
| Feed rate of air blown for atomizing urea solution (Nl/sec) | 1.25 | 1.25 | 1.33 |
| Temperature of atomizing air (°C.) | 100 | 106 | 102 |
| Average amount of particles in fluidized bed (Kg) | 4.82 | 5.77 | 6.00 |
| Average superficial velocity (Uo) of air in fluidized bed (m/sec) | 1.80 | 1.76 | 1.73 |
| Ratio (Uo/Umf) | 2.3 | 2.0 | 2.0 |
| Average temperature of fluidized bed (°C.) | 105 | 100 | 61 |
| Temperature of exhaust gas (°C.) | 82 | 80 | 57 |
| Result | | | |
| Adhering efficiency of urea solution to seed particle (%) | 70 | 77 | 63 |
| Average size of recovered urea granules through conduit 10 (mm) | 2.40 | 2.63 | 2.42 |
| Amount of urea deposited on inside wall surface of cylindrical vessel and upper surface of partition during 10 hours granulating operation | A deposit layer 2-3 mm thick was formed | | none |

Table 4 shows that, in the case where the air stream blown through the holes of the funnel-shaped partition had an excessively high temperature, the inside wall surface of the upper compartment 1a and the upper surface of the funnel-shaped partition were covered by a layer of the deposited particles of urea and the atomized liquid. Table 4 also shows that the excessively high temperature of the air stream blown through the annular opening caused the adhering efficiency of the atomized liquid to be very poor.

What we claim is:

1. A process for producing urea granules in a fluidized bed formed in a vertical cylindrical region which is partitioned into an upper portion and a lower portion thereof by means of a funnel shaped partition converging toward a bottom thereof, said upper portion is connected to said lower portion through a number of holes formed in said partition, which process comprises the steps of:

(A) feeding solid seed particles of urea into said upper portion of said cylindrical region;

(B) atomizing and injecting upward a stream of a liquid containing a material to be incorporated onto said urea seed particles, into said upper portion of said cylindrical region through a nozzle having a top end thereof located just above a center of said bottom of said funnel-shaped partition, said liquid being forwarded to said nozzle through a path extending through said lower portion of said cylindrical region;

(C) forming a fluidized bed of said urea seed particles and said atomized liquid droplets in said upper portion of said cylindrical region, (a) by blowing a number of streams of an inert gas not reactive to urea and said liquid, and having a temperature of from 50° to 98° C., from said lower portion into said upper portion of said cylindrical region through said holes of said funnel-shaped partition, and (b) by blowing upward a stream of an inert gas not reactive to urea and said liquid and having a temperature of from 30° to 120° C. into said upper portion of said cylindrical region through an annular opening formed in said bottom of said partition and surrounding said atomizing nozzle of said liquid, said inert gas being introduced to said annular opening through a path extending through said lower portion of said cylindrical region, whereby said atomized liquid droplets are allowed to adhere onto said urea seed particles and dried or solidified;

(D) discharging the resultant urea granules from said upper portion of said cylindrical region through said annular opening and said inert gas path, and;

(E) discharging exhaust gas from said upper portion of said cylindrical region.

2. A process as claimed in claim 1, wherein said liquid is an aqueous solution containing 50 to 95% by weight of urea.

3. A process as claimed in claim 2, wherein said urea solution contains formaldehyde as an additive.

4. A process as claimed in claim 3, wherein said urea solution containing said formaldehyde is atomized and injected by using a jet of steam.

5. A process as claimed in claim 2, wherein said urea solution contains an urea-formaldehyde condensation product as an additive.

6. A process as claimed in claim 5, wherein said urea solution containing said urea-formaldehyde condensation product is atomized and injected by using a jet of steam.

7. A process as claimed in claim 2, wherein said urea solution has a temperature of from 50° to 130° C.

8. A process as claimed in claim 1, wherein said liquid is a sulphur or polyolefin melt.

9. A process as claimed in claim 1, wherein said sulphur or polyolefin melt has a temperature of from 125° to 160° C.

10. A process as claimed in claim 1, wherein said inert gas stream blown through said annular opening has a linear velocity Uj larger than an average superficial velocity Uo of the inert gas mixture in said upper portion of said vertical cylindrical region.

11. A process as claimed in claim 10, wherein said linear velocity Uj is in a range of from 4 to 10 times said average superficial velocity Uo.

12. A process as claimed in claim 10, wherein said average superficial velocity Uo is in a range of from 1.5 to 8.0 times a minimum fluidization velocity Umf of said inert gas mixture for fluidizing said urea seed particles.

13. A process as claimed in claim 1, wherein said inert gas stream blown through said annular opening has a flow rate Vj corresponding to 10 to 70% of the total flow rate Vo of all of said inert gas streams blown into said upper portion of said cylindrical region.

14. A process as claimed in claim 1, wherein said fluidized bed is maintained at an average temperature of from 50° to 100° C.

15. A process as claimed in claim 1, wherein said urea seed particles are fed at a location above the uppermost end of said funnel-shaped partition.

16. A process as claimed in claim 1, wherein said urea seed particles each has a size of 0.35 mm or more.

17. A process as claimed in claim 1, wherein the distance between said top end of said atomizing nozzle and the level of said annular opening is equal to or smaller than the outer diameter of the annular opening.

18. A process as claimed in claim 1, wherein said liquid is atomized into the form of a circular cone having a vertical angle of about 45 degrees.

19. A process as claimed in claim 1, wherein said liquid is atomized by using an inert gas not reactive to urea and said liquid.

20. A process as claimed in claim 1, wherein each of said inert gases blown through said holes of said funnel-shaped partition and said annular opening, is selected from the group consisting of air, nitrogen gas, carbon dioxide gas and mixtures of two or more of the above-mentioned gases.

21. A process as claimed in claim 17, wherein said inert gas for atomizing said liquid is selected from the group consisting of air, nitrogen gas, carbon dioxide gas, steam and mixtures of two or more of the above-mentioned gases.

22. A process as claimed in claim 2, wherein said urea aqueous solution is atomized by using a jet of steam.

23. A process as claimed in claim 1, wherein said urea seed particles are fed in a location above a zone in which said fluidized bed is formed.

24. A process as claimed in claim 1, wherein said resultant urea ganules are separated from said inert gas by means of a perforated plate arranged in said path extending through said lower portion of said cylindrical region.

* * * * *

UNITED STATES PATENT OFFICE
CERTIFICATE OF CORRECTION

Patent No. 4,217,127                    Dated  August 12, 1980

Inventor(s)          Hisashi Kono, et al

It is certified that error appears in the above-identified patent and that said Letters Patent are hereby corrected as shown below:

Column 1, line 50:   "diesired" should be --desired--.

Column 7, line 54:   Delete "of".

line 59:   "grannulating" should be --granulating--.

Column 12, line 35:   "recoverd" should be --recovered--.

Table 3 (Columns 17-18):   "sulpher" (all occurrences) should be --sulphur--.

Column 22, line 24:   "ganules" should be --granules--.

Signed and Sealed this

Third Day of February 1981

[SEAL]

*Attest:*

RENE D. TEGTMEYER

*Attesting Officer*   *Acting Commissioner of Patents and Trademark*